United States Patent [19]
Karn et al.

[11] Patent Number: 5,250,204
[45] Date of Patent: Oct. 5, 1993

[54] SULFITE OVERBASED PRODUCTS AND PROCESS

[75] Inventors: Jack L. Karn, Richmond Heights; John M. Cahoon, Mentor, both of Ohio

[73] Assignee: The Lubrizol Corporation, Wickliffe, Ohio

[21] Appl. No.: 891,628

[22] Filed: Jun. 1, 1992

Related U.S. Application Data

[63] Continuation-in-part of Ser. No. 539,775, Jun. 18, 1990, abandoned.

[51] Int. Cl.$^5$ .......................................... C10M 159/20
[52] U.S. Cl. .......................................... 252/33; 72/42; 252/33.4; 252/38; 252/42; 252/25
[58] Field of Search ............... 252/33, 25, 18, 33.4, 252/38, 42; 72/42

[56] References Cited

U.S. PATENT DOCUMENTS

| | | | |
|---|---|---|---|
| 2,623,016 | 12/1952 | Mertes et al. | 252/32.7 E |
| 3,629,109 | 12/1971 | Gergel et al. | 252/33 |
| 3,940,341 | 2/1976 | Gray et al. | 252/105 |
| 4,505,830 | 3/1985 | Vinci | 252/33 |
| 4,560,488 | 12/1985 | Vinci | 252/33 |
| 4,598,026 | 7/1986 | Vinci | 252/33 |
| 4,839,094 | 6/1989 | Marsh et al. | 252/33 |
| 4,867,891 | 9/1989 | Hunt | 252/33 |

FOREIGN PATENT DOCUMENTS

| | | |
|---|---|---|
| 210448 | 10/1956 | Australia . |
| 583981 | 9/1959 | Canada . |
| 1242102 | 8/1971 | United Kingdom . |
| 1315848 | 5/1973 | United Kingdom . |

Primary Examiner—Jacqueline V. Howard
Attorney, Agent, or Firm—David M. Shold; Forrest L. Collins

[57] ABSTRACT

Sulfite overbased compositions which are particularly useful in metal-working compositions are obtained.

56 Claims, No Drawings

SULFITE OVERBASED PRODUCTS AND PROCESS

This application is a continuation-in-part of application U.S. Ser. No. 07/539,775, filed Jun. 18, 1990, which is incorporated herein by reference.

INTRODUCTION TO THE INVENTION

This invention related to compositions which are useful in metal-working, lubricating, and other functional fluids and which contain a sulfite overbased product.

It has been suggested that an excess of a basic metal e.g. alkali or alkaline earth metals, may be incorporated in a composition by overbasing. The general process for overbasing a composition uses as a starting material an organic substrate such as a sodium alkyl benzene sulfonate. The organic substrate is then typically contacted with a mixture of an acidic material such as, carbon dioxide, and an excess of a metal source, e.g. caustic soda.

While the exact mechanism of obtaining an overbased product is unknown, it is believed that the substrate, the carbon dioxide (as the carbonate), and the caustic soda form a stable complex. Thus one may obtain in the foregoing parameters a sodium carbonate overbased sodium alkyl benzene sulfonate.

Typically, the sodium overbased composition will be included in a motor vehicle crankcase oil to neutralize acids formed in the degradation of the oil and from crankcase blow-by gases. That is, the alkali metal overbased composition neutralizes acids present within the crankcase. While it might be considered that caustic could simply be added to the composition alone, such would not be soluble or particularly stable within a lubricating composition. Thus overbased salts utilizing carbonate to incorporate the alkali metal or alkaline earth metal containing composition were developed. A further development in overbased compositions includes the use of such materials in metal-working fluids. A metal-working composition is typically used in conditions of high temperature where there is a readily available source of oxygen, e.g. air. Thus metal-working compositions are also prone to degradation through oxidation and acid buildup.

Accordingly, the presence of an excess source of alkali or alkaline earth metal to neutralize acids as they are formed is desirable in a metal-working or other functional fluid. Metal-working fluids often contain a triglyceride or other ester. Often the esters are sulfurized to give extreme pressure benefits to the metalworking composition. The esters are often hydrolyzed (saponified) due to the presence of strong base from the use of an overbased substrate in the metal-working fluid. It is therefore desirable to avoid the use of materials such as carbonate overbased salts in a fluid containing triglycerides or other esters. The present invention deals with obtaining overbased compositions which contain only limited amounts of carbonates or are substantially free of carbonates. Thus such compositions do not promote the degradation of fluids containing triglycerides and other esters.

In U.S. Pat. No. 3,629,109 issued Dec. 21, 1971 to Gergel, Karn and King it is suggested that basic magnesium salts of oil-soluble organic acids may be prepared through the use of a water or an alcohol-water promoter system. The Gergel patent suggests as one possible acidic material the use of sulfur dioxide for forming an overbased substrate. A general disclosure of overbased compositions and their method of preparation is found in Asseff, Mastin, and Rhodes in Canadian Patent 583,981 issued Sep. 29, 1959. Barium sulfite compositions are disclosed in U.K. patent 1,315,848 published May 2, 1973. The barium compositions are used as a diesel smoke suppressor.

In Australian Patent 210,448 published Oct. 25, 1956 it is suggested that oil-soluble polyvalent metal salts of organic acids as detergent additives for lubricating oils may be obtained. The Australian patent states that the oil-soluble basic salts of organic acids which are at least partly not of the oxide, hydroxide or carbonate type may be obtained. U.S. Pat. No. 2,623,016 to Mertes issued Dec. 23, 1952 describes the preparation of oil additives from mahogany acids. It is stated that various salts may be utilized in the process of Mertes including calcium sulfite or sodium sulfite. In U.S. Pat. No. 3,940,341 issued Feb. 24, 1976 to Gray et. al. there are described household detergent compositions containing sodium sulfite which are useful in washing fabrics.

The present invention describes compositions which are at least in part sulfite overbased and which are highly useful in metal-working fluids. The products impart excellent extreme pressure properties, rust inhibition, and provide detergency. Throughout the specification and claims percentages and ratios are by weight, temperatures are in degrees Celsius and pressures are in KPa gauge unless otherwise indicated. Ranges and ratios may be separately combined. To the extent that the references cited herein are applicable to the present invention they are herein incorporated by reference in their entirety.

SUMMARY OF THE INVENTION

The present invention describes a process for preparing a sulfite overbased organic substrate including reacting:

(A) an alkali metal overbased organic substrate prepared by treating the substrate with a source of an alkali metal and an acidic material wherein the acidic material has a higher pKa than sulfurous acid; with (B) a source of sulfurous acid to displace at least a portion of the acidic material from the overbased organic substrate (A);

said reaction being conducted in the substantial absence of added dispersant, thereby obtaining a sulfite overbased organic substrate.

The present invention further describes a process for the sulfite conversion of an alkali metal carbonate overbased substrate including reacting:

(A) an alkali metal carbonate overbased substrate which is at least one of hydrocarbyl-substituted sulfonates, carboxylates, and phenates; with (B) a source of sulfurous acid wherein the mixture thereof is maintained between about 100° C. and 160° C. until the source of sulfurous acid substantially displaces the carbonate, said reaction being conducted in the substantial absence of added dispersant, thereby obtaining an alkali metal sulfite overbased substrate.

A further embodiment of the present invention is a composition which is prepared by reacting:

(A) an overbased alkali metal organic substrate prepared by treating the substrate with a source of an alkali metal and an acidic material wherein the acidic material has a higher pKa than sulfurous acid; with (B) a source of sulfurous acid in an amount sufficient to displace at least a portion of the acidic material from the overbased substrate (A); and further including (C) a sufficient amount of an oil of lubricating viscosity to form a dispersion or solution of the reaction product (A) and (B), said reaction being conducted in the substantial absence of added dispersant.

A still further embodiment of the present invention is a sulfite overbased substrate prepared by:

(A) treating an overbased organic substrate composition with a source of an alkali metal and an acidic material wherein the acidic material has a higher pKa than sulfurous acid; and (B) displacing at least a portion of the acidic material from the overbased substrate with a source of sulfurous acid;

said reaction being conducted in the substantial absence of added dispersant, thereby obtaining a sulfite overbased substrate.

A method is described herein for metal working comprising contacting a metal workpiece with a sulfite overbased organic substrate prepared by reacting:

(A) an alkali metal overbased organic substrate prepared by treating the substrate with a source of an alkali metal and an acidic material wherein the acidic material has a higher pKa than sulfurous acid; with (B) a source of sulfurous acid to displace at least a portion of the acidic material from the overbased organic substrate (A);

said reaction being conducted in the substantial absence of added dispersant, and conducting a metal working operation on the workpiece.

DETAILED DESCRIPTION OF THE INVENTION

As previously described the compositions of the present invention are overbased materials wherein at least a portion of the acidic material employed is derived from sulfur dioxide. To obtain the sulfite overbased organic substrate it is first necessary to obtain an overbased organic substrate based on an acidic material which does not use sulfur dioxide as the acidic material.

For the sulfur dioxide to displace the acidic material in the overbased organic substrate it is necessary that the acidic material have a higher pKa than sulfurous acid. It is noted that sulfurous acid will be the active species when sulfur dioxide is added to a mixture of the overbased organic substrate in the presence of water. That is, there is sufficient water present to generate a substantial amount of sulfurous acid which then generates the sulfite anion in the overbased organic substrate.

The term pKa is defined as the negative log of Ka where $$Ka = \frac{[H+][A-]}{[HA]}$$

and in the foregoing equation the bracketed quantities are the molar concentrations of the hydrogen ion, anion, and the undissociated acid species.

For practical purposes, the materials having a higher pKa than sulfurous acid include at least one of carbon dioxide, hydrogen sulfide; water; alcohols such as methanol, Cellosolves and glycols; phenols; carbon disulfide; or carbonyl sulfide (COS). Of the foregoing acidic materials carbon dioxide is the most readily used material for obtaining an overbased organic substrate. Carbon dioxide is preferred because of its relatively low cost, availability, ease of usage and performance. In one aspect of the present invention it is expected that the product will be obtained as a carbonate overbased organic substrate and that the source of sulfurous acid will be utilized to displace all or a part of the carbon dioxide (carbonate) in the substrate. Examples of utilizing the carbonate overbasing technique in the first instance are described later herein. In another aspect the alkoxide or hydroxide overbased organic substrate may be employed.

THE ORGANIC SUBSTRATE

The next aspect to be discussed in the present invention is the organic substrate which is overbased. Any material which contains both a polar (anionic) moiety and a substantially hydrocarbon soluble moiety may be utilized as the organic substrate. Typically the substrates employed in the present invention will include at least one of a hydrocarbyl-substituted sulfonate, phenate, carboxylate, phosphonate or salicylate. The term hydrocarbyl as used herein includes a moiety which contains carbon and hydrogen and an other species which does not materially affect the performance of the hydrocarbyl-substituted organic substrate.

The sulfonic acids used to form the metallic compound include the aliphatic-substituted aromatic sulfonic acids. Examples of such sulfonic acids are mahogany sulfonic acids; bright stock sulfonic acids; sulfonic acids derived from lubricating oil fraction having a Saybolt Viscosity from about 100 seconds at 37° C. to about 200 seconds at 99° C.; petrolatum sulfonic acids; mono- and polywax substituted sulfonic and polysulfonic acids of, e.g., benzene, naphthalene, phenol, diphenyl ether, naphthalene disulfide, diphenyl amine, thiophene, alpha-chloronaphthalene, etc.; other substituted sulfonic acids such as alkyl benzene sulfonic acids (where the alkyl group has at least 8 carbons), cetylphenyl mono-sulfide sulfonic acids, dicetyl thianthrene disulfonic acids, dilauryl beta-naphthyl sulfonic acids, dicapryl nitronaphthalene sulfonic acids and alkaryl sulfonic acids such as dodecylbenzene (bottoms) sulfonic acids. Dodecylbenzene (bottoms) are principally mixtures of mono- and di-dodecylbenzenes.

The aliphatic sulfonic acids include paraffin wax sulfonic acids, unsaturated paraffin wax sulfonic acids, hydroxy-substituted paraffin wax sulfonic acids, hexapropylene sulfonic acids, tetraamylene sulfonic acids, polyisobutene sulfonic acids wherein the polyisobutene contains from 20 to 700 or more carbon atoms chlorosubstituted paraffin wax sulfonic acids, nitro-paraffin wax sulfonic acids, etc., cycloaliphatic sulfonic acids such as petroleum naphthene sulfonic acids, cetyl cyclopentyl sulfonic acids, lauryl cyclohexyl sulfonic acids, bis-(diisobutyl) cyclohexyl sulfonic acids, mono- or poly-wax substituted cyclohexyl sulfonic acids, etc.

Further details concerning sulfonic acids used herein can be found in U.S. Pat. Nos.

| U.S. Pat. No. | INVENTOR | ISSUE DATE |
| --- | --- | --- |
| 2,616,905 | Asseff et al | November 4, 1952 |
| 3,027,325 | McMillen et al | March 27, 1962 |
| 3,312,618 | Le Suer et al | April 4, 1967 |
| 3,350,308 | McMillen et al | October 31, 1967 |
| 3,471,403 | Le Suer et al | October 7, 1969 |
| 3,488,284 | Le Suer et al | January 6, 1970 |
| 3,595,790 | Norman et al | July 27, 1971 |

| U.S. Pat. No. | INVENTOR | ISSUE DATE |
| --- | --- | --- |
| 3,798,012 | Le Suer | March 19, 1974 |
| 3,829,381 | Le Suer | August 13, 1974 |
| 4,100,083 | Ripple | August 22, 1978 |
| 4,326,972 | Chamberlin | April 27, 1982 |

The useful salts of this invention can be made from phosphorus acids. Such phosphorus acids have been disclosed in a number of U.S. patents and other literature. Exemplary of the former is U.S. Pat. No. 4,191,658 to Jahnke issued Mar. 4, 1980, which discloses phosphorus acid salts of the formula:

$$[R^1(X^1)_a-][R^2(X^2)_b-]P(=X^3)(-X^4) \quad (M)$$

wherein M is a metal; each $R^1$ and $R^2$ is a hydrocarbon radical; each of $X^1$, $X^2$, $X^3$ and $X^4$ is oxygen or sulfur; and each of a and b is 0 or 1. Of the above compounds, the phosphonates are the preferred organic substrates.

A further embodiment of the invention is to use an organic acid as the organic substrate.

The organic acids used to make the salts for the metallic compound include carboxylic acids, particularly those containing from 1 to 30 carbon atoms, e.g., the carboxylates, sulfonic acids, particularly those containing an aromatic ring structure (e.g., benzene ring) substituted with one or more alkyl groups of 4 to about 30 carbon atoms, e.g., a sulfonate, and phosphorus acids, containing within their structures one or more organic groups of 1 to about 30 or more carbon atoms. Preferably, the organic acid is a mixture of organic acids containing an average of at least 7 carbon atoms, conveniently about 4 to about 30, preferably 6 to 30 total carbon atoms per carboxyl group.

Such carboxylic, sulfonic and phosphorus acids are well known to the art. The carboxylic acids can be mono-or polycarboxylic acids (if the latter, typically they are dior tricarboxylic acids).

Monocarboxylic acids include $C_{1-7}$ lower acids (acetic, propionic, etc.) and higher $C_{8+}$ acids (e.g., octanoic, decanoic, etc.) as well as the fatty acids of about 12-30 carbon atoms. The neo acids such as neooctanoic and neodecanoic and the like are also useful.

The fatty acids are often mixtures of straight and branched chain acids containing, for example, from 5% to about 30% straight chain acids and about 70% to about 95% (mole) branched chain acids. Other commercially available fatty acid mixtures containing much higher proportions of straight chain acids are also useful. Mixtures produced from dimerization of unsaturated fatty acids can also be used.

Higher carboxylic acids include the well known dicarboxylic acids made by alkylating maleic anhydride or its derivatives. The products of such reactions are hydrocarbon substituted succinic acids, anhydrides, and the like. Lower molecular weight dicarboxylic acids, such as polymethylene bridged acids (glutaric, adipic, and the like), can also be used to make the salts of this invention as well as the lower molecular weight substituted succinic acids such as tetrapropenyl succinic acid and its analogs of up to about $C_{30}$ substituted acids.

Higher molecular weight substituted succinic anhydrides, acids, and analogs useful in making the salts of this invention have been described in a number of patents, particularly those dealing with acylated compounds useful as dispersants. Typical high molecular weight acids are those made by reacting a poly(isobutene) fraction having between 30 and 400 (usually 50-250) carbon atoms with maleic anhydride. Such materials are described in U.S. Pat. Nos. 3,172,892 issued to Le Suer et. al. on Mar. 9, 1965; 3,219,666 issued to Norman et. al. on Nov. 23, 1965; and 3,272,746 issued to Le Suer et. al. on Sep. 13, 1966. Other monocarboxylic acids of similar molecular weight can be made by alkylating acrylic acid and its analogs. Mixtures of such acids can also be used.

The useful metallic compounds of this invention can also be made from carboxylic acids and even acidic hydroxy compounds such as alkylated phenols. Such materials are disclosed in U.S. Pat. No. 4,100,082 issued to Clason et. al. on Jul. 11, 1978, particularly columns 15-17.

Typically the organic acids used to make the salts of this invention are phenols, carboxylic acids, sulfonic acids, or mixtures thereof, or compounds containing both functional groups. Preferred substrate mixtures include those based on alkyl phenols with a sulfonate and/or a carboxylate. Mixtures of sulfonates and carboxylates (particularly succinates) are also desirable.

A further description of the phenates which are available from phenols are those materials of the formula $$RR^1)_y(R^2)_zAr(OH)_b$$

wherein y is an integer of 1-3, is b is 1 or 2, z is 0 is 1, $R^1$ is a substantially saturated hydrocarbon-based substituent having an average of about 30 to about 400 aliphatic carbon atoms, $R^2$ is selected from the group consisting of lower alkyl, lower alkoxy, nitro, or halo groups and Ar is an aromatic group.

One particular class of phenates for use in this invention are the basic (e.g. overbased) alkali and alkaline earth metal sulfurized phenates made by sulfurizing a phenol with a sulfurizing agent such as sulfur, a sulfur halide, or a sulfide or hydrosulfide salt. Techniques for making the sulfurized phenates are described in U.S. Pat. No. 2,680,096 issued to Walker et. al. on Jun. 1, 1954; U.S. Pat. No. 3,036,971 issued to Otto on May 29, 1962 and U.S. Pat. No. 3,775,321 issued to Turnquest et. al. on Nov. 27, 1973.

Also useful herein as the organic substrate are materials containing both a carboxylic acid function and a hydroxyl functionality. Such compounds are typically of the formula $$R^3Ar(CXXH)_m(XH)_p$$

where $R^3$ is a hydrocarbyl group, preferably an alkyl group of 10 to 30 carbon atoms, X is oxygen or sulfur, Ar is an aromatic group, p is an integer of 1 to 4, usually 1 or 2; m is 1 to 4, usually 1. The alkyl salicylates are typical compounds used herein.

THE INITIAL OVERBASING

As described above the overbased organic substrate is prepared by reacting a substrate with a source of a metal and an acidic material wherein the acidic material has a higher pKa than sulfurous acid. The metals which may be used in the present invention are typically an alkali metal or alkaline earth metal. Typically the metal will be sodium, potassium, or lithium. Most preferably the alkali metal is sodium. The metal source is usually the hydroxide.

The metal to organic substrate equivalent ratio may be in any ratio which results from overbasing. By overbasing it is meant that the equivalents of metal to the organic substrate are greater than 1:1. The metals may be mixed such as a sodium carbonate overbased calcium alkylbenzene sulfonate. Thus the metal ratio or equivalent ratio is the total equivalents of the desired metal to the organic substrate. Typically the equivalent ratio will be about 40:1 to about 5:1, more preferably 30:1 to 12:1.

The acidic material, typically an acidic gas, is contacted with the organic substrate and the source of the metal until no further reaction is observed. Typically, the overbasing is accomplished, when utilizing an acidic gas as the acidic material, when there is no further uptake of the acidic gas.

The point at which the reaction is completed or substantially ceases may be ascertained by any number of conventional methods. One such method is the measurement of the acidic gas entering and leaving the mixture. The reaction may be considered substantially complete when the amount of gas leaving the reaction mixture is about 90-100% by weight of the amount entering. These amounts may be readily determined by the use of metered inlet and outlet valves.

The reaction temperature during the initial overbasing reaction is not critical. Generally, it will be between the solidification temperature of the reaction mixture and its decomposition temperature (the lowest decomposition temperature of any component thereof). Typically the reaction temperature will be from 25° C. to 200° C., preferably about 50° C. to about 150° C. The mixture of the organic substrate, the acidic material and the source of the metal is typically at the reflux temperature of the mixture. Thus if a promoter such as a lower alcohol is employed the reaction will be typically conducted at the reflux temperature of the promoter. Promoters such as methanol may be employed but it is then desirable to remove the alcohol from the reaction mixture.

The initial contacting of the organic substrate, the source of the metal and the acidic material to obtain the overbased organic substrate is typically conducted at atmospheric pressure. It is possible to utilize super-atmospheric pressure to expedite the reaction and promote optimal utilization of the acidic material e.g. an acidic gas. The process may also be carried out at reduced pressure, however this is rarely done.

The initial overbasing reaction is typically carried out in the presence of a substantially inert, normally liquid organic diluent, which functions both as the dispersing and reaction medium. The diluent will typically comprise at least about 10% by weight of the total reaction mixture. Ordinarily the diluent will not exceed 80% by weight of the reaction mixture, and preferably is about 30–70% by weight thereof.

Although a wide variety of diluents are useful, it is preferred to use a diluent which is soluble in an oil of lubricating viscosity or normally liquid fuel. The diluent is often a low viscosity lubricating oil or a normally liquid petroleum distillate.

Additional organic diluents that may be employed either alone or in combination with one another or with a lubricating oil or with a liquid fuel include aromatic hydrocarbons such as benzene, toluene, or xylene; halogenated derivatives thereof such chlorobenzene; lower boiling petroleum distillates such as petroleum ether and the various naphthas; normally liquid aliphatic and cycloaliphatic hydrocarbons such as hexane, heptane, hexene, cyclohexene, cyclopentane, cyclohexane and ethyl cyclohexane, and their halogenated derivatives. It is also possible herein to employ dialkyl ketones such as dipropyl ketones and ethyl butyl ketones, and the alkyl aryl ketones such as actophenone. The liquid organic diluent may also include ethers such as n-propyl ether, n-butyl ether, n-butyl methyl ether and isoamyl ether.

If a combination of an oil and a second diluent is used, the weight ratio of the oil to the second diluent is typically from about 20:1 to about 1:20. It is often desirable for a mineral lubricating oil to comprise at least 50% by weight of the diluent, especially if the product is used as a lubricant additive. The total amount of diluent present is not particularly critical.

The overbasing reaction is preferably conducted in the absence of water, although small amounts may be present (e.g. water present as an impurity in technical grade reagents). Water may be present in an amount up to about 10% of the reaction mixture without causing undesirable effects.

Upon obtaining the overbased organic substrate, any solids in the mixture may be removed by filtration or other conventional methods. Optionally, readily removable diluents, any alcoholic promoter and water formed during the reaction may be removed by techniques such as distillation. It is usually desirable to remove substantially all of the water from the reaction mixture since the presence of water may lead to difficulties in filtration and to the formation of undesirable emulsions in fuels and lubricants. Any water present is readily removed by heating at atmospheric or reduced pressure or by azeotropic distillation.

The acidic material used herein is typically at least one of carbon dioxide, hydrogen sulfide, carbon disulfide, or carbonyl sulfide.

Typical overbased compositions which may be used to prepare the sulfite are described hereinafter.

EXAMPLE 1

To a solution of 790 parts (equivalent weight about 930, molecular weight about 390) of an alkylated aromatic-sulfonic acid in oil and 71 parts of polybutenyl succinic anhydride (equivalent weight about 560) containing predominantly isobutene units in 176 parts of mineral oil is added 320 parts (8 equivalents) of sodium hydroxide and 640 parts (20 equivalents) of methanol. The temperature of the mixture increases to 89° C. (reflux) over 10 minutes due to exotherming. During this period, the mixture is blown with carbon dioxide at 1.89 liters/minute (4 cubic feet/hr.). Carbonation is continued for about 30 minutes as the temperature gradually decreases to 74° C. The methanol and other volatile materials are stripped from the carbonated mixture by blowing nitrogen through the mixture at 0.95 l/minute while the temperature is slowly increased to 150° C. over 90 minutes. After stripping is completed, the remaining mixture is held at 155°–165° C. for about 30 minutes and filtered to yield an oil solution of a basic sodium sulfonate having a metal ratio of about 9.4

EXAMPLE 2

Following the procedure of Example 1, an oil solution of 780 parts (equivalent weight about 930, molecular weight about 390) of an alkylated aromaticsulfonic acid and 119 parts of the polybutenyl succinic anhydride in 442 parts of mineral oil is mixed with 800 parts (20 equivalents) of sodium hydroxide and 704 parts (22 equivalents) of methanol. The mixture is blown with carbon dioxide at 3.31 1/minute for 11 minutes as the temperature slowly increases to 97° C. The rate of carbon dioxide flow is reduced to 2.8 1/minute and the temperature decreases slowly to 88° C. over about 40 minutes. The rate of carbon dioxide flow is reduced to 2.36 1/minute for about 35 minutes and the temperature slowly decreases to 73° C. The volatile materials are stripped by blowing nitrogen through the carbonated mixture at 0.95 1/minute for 105 minutes as the temperature is slowly increased to 160° C. After stripping is completed, the mixture is held at 160° C. for an additional 45 minutes and then filtered to yield an oil solution of a basic sodium (sulfonate) having a metal ratio of about 23.8.

EXAMPLE 3

Following the procedure of Example 1, an oil solution of 3120 parts (3.35 equivalents having an equivalent weight of about 930, molecular weight about 390) of an alkylated aromaticsulfonic acid and 284 parts of polybutenyl succinic anhydride in 704 parts of mineral oil is mixed with 1280 parts (32 equivalents) of sodium hydroxide and 2560 parts (80 equivalents) of methanol. This mixture is blown with carbon dioxide at 4.73 1/minute for about 65 minutes. During this time, the temperature of the mixture increases to 90° C. and then slowly decreases to 70° C. The volatile material is stripped by blowing with nitrogen at 0.95 1/minute for 2 hours as the temperature of the mixture is slowly increased to 160° C. After stripping is complete, the mixture is held at 160° C. for 0.5 hour, and then filtered to yield a clear oil solution of the sodium salt having a metal ratio of 9.6.

EXAMPLE 4

Following the procedure of Example 1, an oil solution of 3200 parts (3.44 equivalents having an equivalent weight of about 930, molecular weight about 390) of an alkylated aromaticsulfonic acid and 284 parts of the polybutenyl succinic anhydride in 623 parts of mineral oil is mixed with 1280 parts (32 equivalents) of sodium hydroxide and 2560 parts (80 equivalents) of methanol. The mixture is blown with carbon dioxide at 4.73 1/minute for about 77 minutes. During this time the temperature increases to 92° C. and then gradually drops to 73° C. The volatile materials are stripped by blowing with nitrogen gas at 0.95 1/minute for about 2 hours as the temperature of the reaction mixture is slowly increased to 160° C. The final traces of volatile material are vacuum stripped and the residue is held at 170° C. and filtered to yield a clear oil solution of the sodium salt, having a metal ratio of about 9.3.

EXAMPLE 5

A solution of 790 parts (0.85 equivalents, having an equivalent weight of about 930, molecular weight about 390) of an alkylated aromaticsulfonic acid in oil, 280 parts of a polybutenyl succinic anhydride (equivalent weight about 560) and 118 parts of nonylphenol (molecular weight 237) and 250 parts of mineral oil is added to 12 equivalents of sodium hydroxide and 640 parts (20 equivalents) of methanol. The temperature of the mixture increases to 50° C. (reflux) over 10 minutes due to exotherming. During this period, the mixture is blown with carbon dioxide at 1.89 1/minute. Carbonation is continued for about 30 minutes as the temperature gradually decreases to 40° C. The methanol and other volatile materials are stripped from the carbonated mixture by blowing nitrogen through the mixture at 0.95 1/minute while the temperature is slowly increased to 150° C. over a period of 90 minutes. After the stripping is completed, the remaining mixture is held at 155-165° C. for about 30 minutes and filtered to yield an oil solution containing the sulfonate, succinate, and phenate. The metal ratio of the composition is about 12.

EXAMPLE 6

A solution of 3120 parts (3.35 equivalents, having an equivalent weight of about 930 and a molecular weight of about 390) of an alkylated aromaticsulfonic acid in oil is added in 600 parts of mineral oil and mixed with 28 equivalents of sodium hydroxide and 2500 parts methanol. The mixture is blown with carbon dioxide at 4.73 1/minute for about 65 minutes. During this the temperature of the mixture increases to 90° C. and then slowly decreases to 70° C. The volatile material present in the reaction mixture is stripped by blowing with nitrogen at 0.95 1/minutes for 2 hours as the temperature of the mixture is slowly increased to 160° C. Following stripping, the mixture is held at the 160° C. temperature for 0.5 hours and then filtered to yield a clear oil solution of the sodium salt having a metal ratio of about 8:1.

EXAMPLE 7

A phenate product is obtained by combining 575 parts (2 equivalents) of a commercial dodecylphenol in 325 parts of mineral oil. To the foregoing mixture is added 24 equivalents of sodium hydroxide. The mixture is blown with carbon dioxide at 4.73 1/minute at a temperature of 110° C. The carbonation of the phenol is completed after about 24 hours. Following this time the volatile materials are stripped by blowing nitrogen gas through the mixture at 0.95 1/minute for a 2 hours period. Any final traces of volatile materials are vacuum stripped at 170° C. followed by filtering to yield a clear oil solution having a metal ratio of 12.

Conveniently in the present invention mixed substrate systems may be employed. Where a mixed substrate system is employed typically a sulfonate will be used in conjunction with either an alkylphenate and/or a polycarboxylate such as the succinate. The sulfonate is usually present in from 2-4 equivalents per equivalent of the alkylphenate or the succinate.

THE SULFITE OVERBASING

The sulfite exchange is accomplished using a source of sulfurous acid. An overbased substrate is treated with a source of sulfurous acid in a typical fashion immediately after its initial overbasing.

It is preferred that the sulfite overbasing step be conducted in the substantial absence of added water, particularly when the source of the sulfurous acid is an acidic gas such as $SO_2$. Normally only a trace amount of water, e.g. less than about 1% by weight, is present in the initially overbased intermediate. Even if a trace of water should be necessary for the conversion reaction, the amount present in the intermediate is sufficient so that no further water need normally be added. Furthermore, it has been found that a smooth conversion can be accomplished even in the absence of added dispersants (peptizing agents) which might be used to facilitate dispersion of the overbased material in oil. Accordingly, it is preferred that the reaction be conducted in the substantial absence of such added dispersants.

The source of sulfurous acid is contacted with the initially overbased organic substrate at any convenient flow rate. Typically the exchange of the sulfite for the acidic material will be at a flow rate of 0.5 l/minute to 25 l/minute for each 500 weight parts of the initial substrate.

The temperature for the exchange is typically at 70° C. to 200° C., conveniently 100° C. to 160° C., and more preferably at 105° C. to 140° C. The exchange (metathesis) time will depend on the desired degree of exchange of sulfite for the acidic material. Often 1 hour to 48 hours is allowed for the exchange. More typical times are 3 hours to 18 hours with greater exchange occurring as time progresses. Using the foregoing process a sulfite overbased substrate may be substantially obtained. Often an incomplete exchange reaction is desired and the weight ratio of the sulfite overbased substrate to the acidic material overbased substrate is 20:1 to 1:20, often 20:1 to 1:1. Most desirably the exchange reaction is quantitatively complete. The products obtained in the exchange reaction are superior in extreme pressure properties to non-sulfite products.

What follows are examples of the metathesis of the present invention.

EXAMPLE I 500 parts of the substrate of Example 1 are placed in a suitable reaction vessel and the temperature is raised to 110° C. At this temperature sulfur dioxide gas is introduced to the bottom of the reaction vessel and begins to displace the carbonate from the initial product.

The flow rate of the sulfur dioxide is 0.5 l/minute and is maintained at that flow rate for a period of 9 hours until the exchange is substantially complete.

The end point of the reaction is determined by infrared spectral analysis. The spectral analysis which is conducted periodically allows for the observation of the disappearance of the carbonate peak from the product. Measurement of completeness of the exchange reaction may also be made by observing the disappearance of the strong base number associated with the carbonate product.

EXAMPLE II 1610 parts of the substrate of Example 2 are placed in a suitable reaction vessel and the temperature is raised to 105° C. At this temperature sulfur dioxide gas is introduced to the bottom of the vessel at a flow rate of 1 l/minute and begins to displace the carbonate from the substrate.

The flow rate is varied to lower levels as the reaction proceeds with a final input rate of 0.2 l/minute. Sulfur dioxide input is carried out for a period of 11 hours until the exchange is substantially complete.

The end point of the reaction is determined by infrared spectral analyses and by acid titrations. The strong base number is determined by titration with aqueous HCl (0.1 N) in a rapidly stirred mixture of toluene, isopropanol and water. Phenolphthalein is used as a colorimetric indicator and titration is continued until the red indicator color disappears. The strong base number is expressed as mg KOH/g sample and is typically less than 5 and more preferably nil. Substantially similar results are obtained using in Example I and in this example the hydroxides of lithium and potassium.

EXAMPLE III 6900 parts of the substrate of Example 2 are placed in a suitable reaction vessel and the temperature is raised to about 100° C. At this time the addition of sulfur dioxide is begun at about 2.0 l/minute. The rate of addition is reduced in stages to a final value of 0.1 l/minute over a reaction time of 28 hours.

At this time the reaction is substantially complete as indicated by the infrared spectral analysis. The carbonate is observed to disappear by loss of the peak at 11–12 microns. The sulfite builds up and a new peak is observed at 10–11 microns. Additionally the strong base number is monitored and is observed to approach zero.

Substantially similar results are obtained when substituting the overbased composition of Examples 2–7 into Examples I and II; and in substituting the composition of Examples 1, and 3 through 7 into Example III.

The compositions of the invention are typically utilized with an oil such as is useful in a metal working or cutting fluid. Listed below are examples of materials suitable as lubricants.

THE OIL OF LUBRICATING VISCOSITY

The oil of lubricating viscosity which is utilized in the preparation of the fluids of the invention may be based on natural oils, synthetic oils, or mixtures thereof.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); poly(1-hexenes), poly-(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization or ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500 etc.) or mono- and polycarboxylic esters thereof, for example, the acetic acid esters, mixed $C_3$–$C_8$ fatty acid esters, or the $C_{13}$ oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)-silicate, tetra-(p-tert-butylphenyl)silicate, hexyl(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioxtyl phosphate, diethyl ester of decane phosphonic acid, etc.), polymeric tetrahydrofurans and the like.

The fluids of the present invention may also contain water. When water is employed with the lubricating oil it is typically present at 5% to 80%, preferably 10% to 70% by weight of the lubricating oil. The amount of water is typically enough to dissolve or disperse any remaining components. Emulsifiers are often used to assist in preparing emulsions of the oil and water fluids.

The end-use compositions herein are prepared by mixing all of the ingredients in any order at a temperature sufficient to ensure that the product is substantially homogeneous. Typically, the oil of lubricating viscosity in a metal working or cutting fluid will be at 200 to 1,000 parts and the sulfite overbased organic substrate at 4 to 100 parts. The ester, monoglyceride, diglyceride and triglyceride components when employed as a portion of the oil of lubricating viscosity will be usually at 1% to 50% by weight thereof. Suitable esters and glycerides or their sulfurized analogs include, mono-oleates (e.g. fatty esters), lard (tallow), soya, rapeseed, castor bean, corn, sunflower or cottonseed oils.

A typical heavy duty metal-working composition contains 1-20% sulfited detergent, 1-20% sulfurized triglyceride, and 1-20% active sulfur compound and the remainder low viscosity mineral oil.

Metal working operations include cutting and forming operations. The cutting operations include drilling, tapping, broaching, punching, and milling and the like. Forming operations include bending, stamping, rolling and pressing and the like. The operations are conducted on ferrous or non-ferrous metals or alloys such as steel, copper, aluminum, bronze, brass and titanium.

Additional ingredients which may be employed herein include sulfurized olefins, dyes, anti-microbial agents, anti-foams and the like.

Products formulated using the components of the invention are described below.

| Component | EXAMPLE A-1 Parts | EXAMPLE A-2 Parts |
|---|---|---|
| 100N oil | 89.75 | 89.75 |
| Invention of Example II | 5.5 | — |
| Product of Example 2 | — | 5 |
| Lard oil | 5 | 5 |
| Tap water | 0.25 | 0.25 |

The foregoing are mixed together and heated for one week at 65° C. to determine gelling tendency. The product of the invention (A-1) does not gel while a comparable carbonate overbased product (A-2) fully gels.

| Component | EXAMPLE B-1 Parts | EXAMPLE B-2 Parts |
|---|---|---|
| 100N oil | 95 | 95 |
| *Invention of Example II | 5.5 | — |
| Sulfurized diisobutylene | — | — |
| Sulfurized alpha-olefin, triglyceride and oleic acid mixture | — | — |
| *Product of Example 2 | — | 5 |

The product of Example B-1 of the invention shows superior performance over Example B-2 in tapping hot rolled steel.

| Component | EXAMPLE C-1 Parts | EXAMPLE C-2 Parts |
|---|---|---|
| 100N oil | 95 | 95 |
| *Invention of Example III | 2.75 | — |
| Sulfurized diisobutylene | 2.5 | 2.5 |
| Sulfurized alpha olefin, triglyceride and oleic acid mixture | 4.0 | 4.0 |
| *Product of Example 2 | — | 2.5 |

The product of the present invention has a 4 ball weld test fail at 500 kg versus 400 kg for a conventional product.

| Component | EXAMPLE D-1 Parts | EXAMPLE D-2 Parts |
|---|---|---|
| 100N oil | 95 | 95 |
| *Invention of Example III | 2.75 | — |
| Product of Example 2 | — | 2.5 |

The formulations containing sulfite materials of this invention show superior 4 ball weld, better 1020 hot rolled steel tapping and better 304 stainless steel tapping than the conventional formulations. Substantially similar results are obtained when the products of Examples 1 and 3 are used in Examples A-D. *Equivalent levels of sodium in each product in all tests.

What is claimed is:

1. A process for preparing a sulfite overbased organic substrate including reacting:
   (A) an alkali metal overbased organic substrate prepared by treating the substrate with a source of an alkali metal and an acidic material wherein the acidic material has a higher pKa than sulfurous acid; with
   (B) a source of sulfurous acid to displace at least a portion of the acidic material from the overbased organic substrate (A);

said reaction being conducted in the substantial absence of added dispersant, thereby obtaining a sulfite overbased organic substrate.

2. The process of claim 1 wherein the metal is sodium.

3. The process of claim of 1 wherein the organic substrate is at least one of hydrocarbyl-substituted sulfonates, phenates, carboxylates, phosphonates, and salicylates.

4. The process of claim 1 wherein the acidic material is at least one of carbon dioxide, hydrogen sulfide, carbon disulfide, or carbonyl sulfide.

5. The process of claim 1 wherein step (B) is conducted in the substantial absence of a promoter.

6. The process of claim 1 wherein the reaction is conducted in the substantial absence of added water.

7. The process of claim 1 wherein the source of sulfurous acid is sulfur dioxide.

8. The process of claim 1 wherein the substrate is a sulfonate.

9. The process of claim 1 wherein the temperature is maintained between about 70° C. to about 200° C. during the reacting with the source of sulfurous acid.

10. The process of claim 8 wherein the metal is sodium.

11. The process of claim 1 wherein the organic substrate is a mixture of an alkylphenol and at least one other substrate.

12. The process of claim 9 wherein the temperature is maintained between about 100° C. to 160° C. during the treating with the source of sulfurous acid.

13. The process of claim 2 wherein the organic substrate is an aliphatic-substituted aromatic sulfonate.

14. The process of claim wherein the metal to organic substrate equivalent ratio is about 40:1 to about 5:1.

15. The process of claim 3 wherein the organic substrate is a carboxylate which is an aliphatic-substituted succinic acid or derivative thereof.

16. The process of claim 14 wherein the metal to organic substrate equivalent ratio is about 30:1 to about 12:1.

17. The process of claim 1 wherein the weight ratio of the source of sulfurous acid to the acidic material is 20:1 to 1:20 in the sulfite overbased substrate.

18. The process of claim 1 wherein the source of sulfurous acid substantially displaces all of the acidic material from the overbased organic substrate (A).

19. The process of claim 1 wherein the organic substrate is a hydrocarbyl sulfonate, the alkali metal is sodium, the acidic material is carbon dioxide, and the source of sulfurous acid is sulfur dioxide.

20. A process for the sulfite conversion of an alkali metal overbased substrate including reacting:
(A) an alkali metal carbonate overbased substrate which is at least one of hydrocarbyl-substituted sulfonates, carboxylates, and phenates; with
(B) a source of sulfurous acid wherein the mixture thereof is maintained between about 100° C. and 160° C. until the source of sulfurous acid substantially displaces the carbonate,
said reaction being conducted in the substantial absence of added dispersant, thereby obtaining an alkali metal sulfite overbased substrate.

21. The process of claim 20 wherein the alkali metal carbonate overbased substrate is a hydrocarbyl-substituted sulfonate.

22. The process of claim 20 wherein the metal to organic substrate equivalent ratio is about 40:1 to about 5:1.

23. The process of claim 20 wherein step (B) is conducted in the substantial absence of a promoter.

24. The process of claim 20 the reaction is conducted in the substantial absence of added water.

25. A composition which is prepared by reacting:
(A) an overbased organic substrate prepared by treating the substrate with a source of a metal and an acidic material wherein the acidic material has a higher pKa than sulfurous acid; with
(B) a source of sulfurous acid in an amount sufficient to displace at least a portion of the acidic material from the overbased substrate (A); and said composition further including
(C) a sufficient amount of an oil of lubricating viscosity to form a dispersion or solution of the reaction product (A) and (B),
said reaction being conducted in the substantial absence of added dispersant.

26. The composition of claim 25 wherein the oil of lubricating viscosity comprises a fatty ester, a monoglyceride, diglyceride, or triglyceride or a sulfurized derivative thereof.

27. The composition of claim 25 wherein the oil of lubricating viscosity is a mineral oil.

28. The composition of claim 26 wherein the triglyceride is at least one of: a mono-oleate, soya oil, rapeseed oil, castor bean oil, corn oil, sunflower oil, cottonseed oil and tallow or the sulfurized derivatives thereof.

29. The composition of claim 26 wherein the reaction is conducted in the substantial absence of added water.

30. A sulfite overbased substrate composition prepared by:
(A) obtaining an alkali metal overbased organic substrate, treating the substrate with a source of a metal and an acidic material wherein the acidic material has a higher pKa than sulfurous acid; and
(B) displacing at least a portion of the acidic material from the overbased substrate with a source of sulfurous acid;
said reaction being conducted in the substantial absence of added dispersant, thereby obtaining a sulfite overbased substrate.

31. The composition of claim 30 additionally containing a fatty ester or the sulfurized analog thereof.

32. The composition of claim 30 containing a sulfurized olefin.

33. The composition of claim 30 wherein the organic substra is at least one of hydrocarbyl-substituted sulfonates, phenates, carboxylates, phosphonates, and salicylates.

34. The composition of claim 33 wherein the organic substrate is an aliphatic-substituted aromatic sulfonate.

35. The composition of claim 30 wherein the alkali metal is sodium.

36. The composition of claim 31 wherein the alkali metal is sodium.

37. The composition of claim 30 wherein the reaction is conducted in the substantial absence of added water.

38. A method of metal working comprising contacting a metal workpiece with a fulfite overbased organic substrate prepared by reacting:
(A) an alkali metal overbased organic substrate prepared by treating the substrate with a source of an alkali metal and an acidic material wherein the acidic material has a higher pKa than sulfurous acid; with (B) a source of sulfurous acid to displace at least a portion of the acidic material from the overbased organic substrate (A);

said reaction being conducted in the substantial absence of added dispersant, and conducting a metal working operation on the workpiece.

39. The method of claim 38 wherein the metal working is a cutting operation including drilling, tapping, broaching, milling, and punching.

40. The method of claim 38 wherein the metal working operation is a metal forming operation including bending, stamping, rolling, and pressing.

41. The method of claim 38 wherein the substrate is at least one of hydrocarbyl-substituted sulfonates, phenates, carboxylates, phosphonates, and salicylates.

42. The method of claim 41 wherein the organic substrate is an aliphatic-substituted aromatic sulfonate.

43. The method of claim 38 wherein the alkali metal is sodium.

44. The method of claim 43 wherein the organic substrate is an aliphatic-substituted aromatic sulfonate.

45. The method of claim 38 wherein the reaction is conducted in the substantial absence of added water.

46. The method of claim 38 wherein the metal workpiece is ferrous metal.

47. The method of claim 38 wherein the metal workpiece is a non-ferrous metal.

48. A workpiece having thereon or therein the composition of claim 1.

49. The composition of claim 25 wherein the oil of lubricating viscosity comprises at least about 40% by weight of the composition.

50. The composition of claim 30 further comprising a fatty ester of the sulfurized analog thereof.

51. The composition of claim 30 further comprising a sulfurized olefin.

52. The composition of claim 30 further comprising a sulfurized triglyceride, an active sulfur compound, or mixtures thereof.

53. The composition of claim 25 wherein the oil of lubricating viscosity is an oil suitable for metal-working operations.

54. The composition of claim 25 further containing water in an amount of about 5% to about 80% by weight based on the amount of oil of lubricating viscosity.

55. The composition of claim 54 further comprising an emulsifier.

56. The process of claim 1 wherein the source of sulfurous acide displaces less than substantially all of the acidic material from the overbased organic substrate (A) such that the weight ratio of the resulting sulfite overbased substrate to the remaining acidic material overbased substrate is about 20:1 to about 1:20.

* * * * *